US008790432B2

(12) United States Patent
Roehmer et al.

(10) Patent No.: US 8,790,432 B2
(45) Date of Patent: Jul. 29, 2014

(54) SEAM-SEALED FILTERS AND METHODS OF MAKING THEREOF

(75) Inventors: Rebecca Lynn Roehmer, Elkton, MD (US); Steve Emmett Minor, Elkton, MD (US); Scott Zero, Newark, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 0 days.

(21) Appl. No.: 13/458,442

(22) Filed: Apr. 27, 2012

(65) Prior Publication Data

US 2013/0283742 A1 Oct. 31, 2013

(51) Int. Cl.
*B32B 27/00* (2006.01)

(52) U.S. Cl.
USPC ....... 55/381; 428/315.5; 428/343; 428/355 R; 428/304.4; 55/522; 55/528; 55/DIG. 5; 156/250; 156/304.1

(58) Field of Classification Search
USPC .......... 156/60, 73.3, 148, 250, 277, 256, 226, 156/73.1; 428/57, 61, 315.5, 36.1; 55/522, 55/524, DIG. 2, DIG. 5, 368, 382
See application file for complete search history.

(56) References Cited

U.S. PATENT DOCUMENTS

| 3,953,566 | A | | 4/1976 | Gore |
| 4,110,392 | A | | 8/1978 | Yamazaki |
| 4,187,390 | A | | 2/1980 | Gore |
| 4,983,434 | A | | 1/1991 | Sassa |
| 5,162,149 | A | * | 11/1992 | Reaney ........................ 428/315.5 |
| 5,437,910 | A | * | 8/1995 | Raabe et al. ................... 428/194 |
| 5,527,569 | A | | 6/1996 | Hobson et al. |
| 5,549,966 | A | | 8/1996 | Sassa |
| 5,647,881 | A | * | 7/1997 | Zhang et al. ..................... 55/382 |
| 5,667,611 | A | | 9/1997 | Sassa |
| 5,928,414 | A | | 7/1999 | Wnenchak et al. |
| 7,306,729 | B2 | | 12/2007 | Bacino et al. |
| 7,481,952 | B2 | | 1/2009 | Ren et al. |
| 8,377,536 | B2 | * | 2/2013 | Cienski ........................... 428/57 |
| 8,435,617 | B2 | * | 5/2013 | Hannon .......................... 428/57 |
| 2004/0138372 | A1 | | 7/2004 | Uschold et al. |
| 2008/0044614 | A1 | * | 2/2008 | Hannon .......................... 428/57 |
| 2010/0215889 | A1 | * | 8/2010 | Cienski ........................... 428/57 |
| 2012/0131890 | A1 | * | 5/2012 | Schultink et al. ............... 55/368 |
| 2012/0282425 | A1 | * | 11/2012 | Gallagher ....................... 428/61 |
| 2013/0153119 | A1 | * | 6/2013 | Hannon ....................... 156/73.3 |
| 2013/0192753 | A1 | * | 8/2013 | Johnson et al. ............... 156/277 |

OTHER PUBLICATIONS

International Search Report PCT/US2013/038322 dated Aug. 21, 2013.

* cited by examiner

*Primary Examiner* — Duane Smith
*Assistant Examiner* — Minh-Chau Pham
(74) *Attorney, Agent, or Firm* — Amy L. Miller (57) ABSTRACT

A seam-sealed filter in which the seam is sealed with a seam tape comprised of an expanded fluoropolymer, such as ePTFE and copolymers thereof, having a crosswise matrix modulus of greater than 1,950 psi and an enthalpy ratio of less than 0.6 is disclosed. Such seam-sealed filters are capable of undergoing greater than 50,000 pulse-jet or reverse air cleaning cycles without substantial cracking or peeling of the sealed seam. Accordingly, the seam-sealed filters in the form of bags are particularly suitable for use in reducing particulate emissions in cement baghouses and the like.

51 Claims, 4 Drawing Sheets

FIG. 5

SEAM-SEALED FILTERS AND METHODS OF MAKING THEREOF

FIELD OF THE INVENTION

The invention relates to a durable seam-sealed filter, particularly a filter bag, which is suitable for filtering particulate impurities from industrial fluid streams. The filter bag is especially suitable for use in filtering and collecting particulate matter emissions, such as dust particulates, in baghouses in cement plants.

BACKGROUND OF THE INVENTION

The separation of particulate matter from industrial fluid streams is often accomplished using laminate filters. These textile-based laminate filters remove particulates from the streams. When the resistance to flow or pressure drop through the textile caused by accumulation of particulate on the filter becomes significant, the filter must be cleaned, and the particulate removed from the filter.

It is common in the industrial filtration market to characterize the type of filter bag by the method of cleaning. The most common types, of cleaning techniques are reverse air, shaker, and pulse-jet. Reverse air and shaker techniques are considered low energy cleaning techniques.

In reverse air filtration techniques particulate collects on the interior of the bag. During cleanings, a gentle backwash of air collapses the bag and fractures the dust cake off the bag, which dust exits the bottom of the bag into a hopper.

Shaker mechanisms clean dust cakes that collect on the inside of a bag as well. The top of the bag is attached to an oscillating arm which creates a sinusoidal wave in the bag to dislodge the dust cake.

In Pulse-jet filtration, the particulate is captured on the outside of the bag. Pulse-jet cleaning techniques employ a short pulse of compressed air that enters the interior top portion of a filter bag or tube. The energy of this cleaning pulse expands the bag, knocking off the dust cake. The bag, will typically snap back to a cage support and go right back into service collecting particulate.

Of the three cleaning techniques, pulse-jet is the most stressful on the filter media. However, in recent years, industrial process engineers have increasingly selected pulse-jet baghouses for dust collection applications because of:
1. Smaller unit size (sometimes as much as ½ or ¼ the size of shakers and reverse air) due to:
(A) higher volumetric airflow/cloth area ratio (higher operating velocity through media); and
(B) on-line cleaning allows the unit to be designed at the desired flow rate, hence there is no need for additional filter media area to allow for off-line cleaning.
2. Minimal number of moving parts.
3. Lower number of bags to replace.

In a pulse-jet baghouse, bags are inserted into the baghouse with a metal cage on the inside to keep them from collapsing. Dirty air containing dust enters the baghouse on the outer side of the bag where the dust accumulates on the surface. The cleaned air travels through the bag and out of the baghouse. When a sufficient amount of dust has accumulated on the outside of the bag to cause a decreased amount of air flow through, the bag, the pulse-jet baghouse sends a pulse of high pressure air backwards through the bag. The accumulated dust is forced off the bag for collection in the lower portion of the baghouse by a combination of the high pressure air and the movement in the bag caused by the back pulse. This cleaning process may occur multiple times an hour to maintain sufficient air flow through the bag.

The movement in the bag mentioned above is a result of high pressure air imparting a stress on the bag. This imparted stress causes the bag to strain in all directions. When a seam is stressed, leak paths may develop which may expand over time, thus allowing dust to escape the baghouse. If stitch holes are present at a seam, when the seam is stressed, the stitch holes can also become leak paths which may expand over time, allowing dust to escape the baghouse. The seam itself may be strong enough to withstand stress without breaking; however, when a seam tape is applied to the seam to block the entry of dust into these leak paths, the seam tape should desirably remain substantially free of cracking, peeling or breaking under stress.

Any seam tape that is applied to the seam needs to survive repeated bag cleaning cycles (>50,000) during the life of the bag (>3 years).

However, currently available seam tapes used to seal the seam of a filter bag cannot withstand the repeated stresses of multiple pulse-jet cleaning cycles over the lifetime of the filter bag. Due to seam geometry and how the seam tape is applied to the seam, crosswise direction stresses concentrate within the seam tape. These stresses result in premature cracks and can expose stitch holes in the seam down the length of the filter bag. These cracks and holes are leak paths which may results in increased dust emissions.

Therefore, seam tapes used for sealing the seams of filter bags needed to withstand multiple cleaning cycles (>50,000) without substantially cracking or peeling, where cracking and peeling allows for particulate matter infiltration through the seam.

The EPA has passed new, more stringent regulations for both existing and new particulate matter sources in regard to further reducing particulate matter emissions from cement plants. To ensure compliance with the regulations, filter bag manufacturers need to: thus further reduce emissions from filter bags in the baghouse.

There therefore remains an unresolved need for seam-sealed filter bags and for seam tapes for sealing the seams of filter bags, which can withstand multiple pulse-jet or reverse-air cleaning cycles over the lifetime of the filter bag, and, advantageously limit particulate emissions to levels-which meet EPA standards.

SUMMARY OF THE INVENTION

It has now been advantageously discovered that seam tapes comprised of an expanded fluoropolymer having a crosswise direction matrix modulus of greater than about 1,950 psi at room temperature and an enthalpy ratio of less than 0.6 can advantageously withstand repeated cleaning cycles (>50,000) over the lifetime of a filter bag (>3 years). An exemplary expanded fluoropolymer is expanded polytetrafluoroethylene (ePTFE).

Accordingly, the seam tapes are particularly suitable to seal and maintain the filtration integrity of the seams of filter bags which undergo repeated cleaning cycles during dust emission collections, thus achieving lower dust emissions over the lifetime of the seam-sealed filter bags of the invention than is currently available with other filter bags.

Seam tapes provided by way of the invention surprisingly exhibit substantially no holes visible to the eye; substantially no visible cracking; and substantially no leak paths visible with scanning electron microscopy at a magnification greater than 2500×, through which dust emissions 2.5 μm and greater can infiltrate the tape, even after undergoing multiple cleaning cycles as described above.

It is an object then of the invention to provide a seam-sealed filter which comprises:
(a) a filter media having at least two adjacent edge portions joined by a seam; and
(b) a seam tape comprising a layer of an expanded fluoropolymer and a material for adhering to and sealing the seam, the seam tape being disposed over the seam, the tape having a lengthwise direction substantially parallel to the seam and a crosswise direction substantially perpendicular to the seam; wherein the expanded fluoropolymer of the seam tape has a crosswise direction matrix modulus of greater than about 1,950 psi at room temperature and an enthalpy ratio of less than 0.6.

In another embodiment, the expanded fluoropolymer component of the seam tape has a crosswise direction matrix modulus of greater than about 4,000 psi.

In a more preferred embodiment, the expanded fluoropolymer has a crosswise direction matrix modulus of greater than about 8,000 psi.

In the most preferred embodiment, the expanded fluoropolymer has a crosswise direction matrix modulus of greater than about 12,000 psi.

In another embodiment, the expanded fluoropolymer component of the seam tape has an enthalpy ratio of less than about 0.45.

In a more preferred embodiment, the expanded fluoropolymer has an enthalpy ratio of less than about 0.3.

In the most preferred embodiment, the expanded fluoropolymer has an enthalpy ratio of less than about 0.2.

In another embodiment of the invention, the material for adhering and sealing the seam of the filter includes but is not limited to a continuous or discontinuous adhesive layer or an expanded fluoropolymer that can act as an adhesive.

Accordingly, another object of the invention is a filter comprising:
(a) a filter media having at least two adjacent edge portions joined by a seam; and
(b) a seam tape comprising an expanded fluoropolymer that can act as an adhesive to adhere to and seal the seam, the seam tape being disposed over the seam, the tape having a lengthwise direction substantially parallel to the seam and a crosswise direction substantially perpendicular to the seam; wherein the expanded fluoropolymer of the seam tape has a crosswise direction matrix modulus of greater than about 1,950 psi at room temperature and an enthalpy ratio of less than 0.6.

An exemplary embodiment of the invention is a seam-sealed filter bag for use in cement baghouses to filter and collect dust particulates.

Another object of the invention is to provide a method of making a seam-sealed filter which comprises:
(a) providing a filter media having at least two adjacent edge portions joined by a seam;
(b) applying a seam tape to the seam, which seam tape comprises a layer of an expanded fluoropolymer and a material for adhering to and sealing the seam, the seam tape being disposed over the seam, the tape having a lengthwise direction substantially parallel to the seam and a crosswise direction substantially perpendicular to the seam; wherein the expanded fluoropolymer component of the seam tape has a crosswise direction matrix modulus of greater than about 1,950 psi at room temperature and an enthalpy ratio of less than 0.6; and
(c) sealing the adhering material of the seam tape to the seam to make a seam-sealed filter.

Yet another object of the invention is to provide a seam tape which comprises a layer of an expanded fluoropolymer and a material for adhering to and sealing a seam, wherein the expanded fluoropolymer of the seam tape has a crosswise direction matrix modulus of greater than about 1,950 psi at room temperature and an enthalpy ratio of less than 0.6.

An exemplary expanded fluoropolymer for use in the seam tape is expanded polytetrafluoroethylene (ePTFE).

The seam tapes are particularly suitable for use in sealing a seam which undergoes repeated stresses which can compromise the integrity of the seam.

In another embodiment, the seam tape may be constructed to be sufficiently conductive to dissipate the static charge from a bag. Static dissipation may aid in cleaning the dust cake off of the bag. Static dissipation can be achieved through the addition of conductive carbon, metal particulates, etc. to the expanded fluoropolymer such that the seam tape would have a resistivity of less than $10^{13}$ Ohms-cm.

By way of the invention then, seam-sealed filter bags and seam tapes for sealing the seams of the filter bags are provided which can withstand repeated cleaning cycles (>50,000) over the lifetime of the bag (>3 years) while substantially maintaining the structural integrity of the sealed seam, so as to meet the new, more stringent EPA Emissions Standards for particulate emissions from baghouses in cement plants.

The foregoing and other objects, features, and advantages of the invention will appear more fully hereinafter from a consideration of the detailed description that follows. It is to be expressly understood, however, that the drawings are for illustrative purposes and are not to be construed as defining the limits of the invention.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION

Unless defined otherwise, all technical and scientific terms used herein have the same meaning as commonly understood by one of ordinary skill in the art to which the invention belongs. All references cited herein, including published or corresponding U.S. or foreign patent applications, issued U.S. or foreign patents, and any other references, are each incorporated by reference in their entireties, including all data, tables, figures, and text presented in the cited references. In the drawings, the thickness of the lines, layers, and regions may be exaggerated for clarity. Like numbers found throughout the figures denote like elements. The terms "a" or "an" as used herein are to describe elements and components of the invention. This is done merely for convenience and to give a general sense of the invention. The description herein should be read to include one or at least one and the singular also includes the plural unless indicated to the contrary. When the term "ePTFE" is used herein, it shall be understood to encompass expanded PTFE and copolymers of thereof.

For clarity, the expanded fluoropolymer will have a transverse and longitudinal direction as made. Once the seam tape is applied to the filter material, lengthwise will be used to describe the direction parallel to the seam while crosswise will be used to describe the direction Which is perpendicular to the seam. The focus of the invention for matrix modulus of the expanded fluoropolymer is the crosswise direction. That is, a seam tape as made could be applied such that the longitudinal direction of the expanded fluoropolymer is perpendicular to the seam, in which case the longitudinal matrix modulus would be the crosswise matrix modulus. Similarly, if the seam tape as made is applied with the transverse direction perpendicular to the seam, the transverse matrix modulus would be the crosswise matrix modulus. Therefore, the crosswise direction matrix modulus refers to the matrix modulus of the seam tape as made in the direction which will be perpendicular to the seam once applied to the filter media.

The present invention provides a seam-sealed filter in which a seam is sealed with a seam tape comprised of an expanded fluoropolymer which has a crosswise direction matrix modulus of greater than about 1,950 psi at room temperature and an enthalpy ratio of less than 0.6. The seam-sealed filters of the invention can help reduce particulate emissions to meet current emissions standards.

The present invention is directed to a seam-sealed filter and method of making the same. The invention provides a filter which comprises a filter media having at least two adjacent edge portions joined by a seam; and a seam tape comprising a layer of an expanded fluoropolymer and a material for adhering to and sealing the seam, said seam tape being disposed over the seam, the tape having a lengthwise direction substantially parallel to the seam and a crosswise direction substantially perpendicular to the seam; wherein the expanded fluoropolymer component of the seam tape has a crosswise direction matrix modulus of greater than about 1,950 psi at room temperature and an enthalpy ratio of less than 0.6.

An exemplary embodiment according to the invention is a filter which is a bag for use in cement baghouses.

In another embodiment, the expanded fluoropolymer component of seam tape has a crosswise direction matrix modulus of greater than about 4,000 psi.

In a more preferred embodiment, the expanded fluoropolymer has a crosswise direction matrix modulus of greater than about 8,000 psi.

In the most preferred embodiment, the expanded fluoropolymer has a crosswise direction matrix modulus of greater than about 12,000 psi.

In another embodiment, the expanded fluoropolymer has an erthalpy ratio of less than about 0.45.

In a more preferred embodiment, the expanded fluoropolymer has an enthalpy ratio of less than about 0.3.

In the most preferred embodiment, the expanded fluoropolymer has an enthalpy ratio of less than about 0.2.

Any filter having a seam is suitable for use in the present invention. Filters which undergo repeated stresses in pulse-jet or reverse air cleaning operations, such as filter bags for use in baghouses for filtering and collecting particulate emissions from a gaseous stream, are especially suitable. In an exemplary embodiment, a seam-sealed filter is provided which can withstand multiple cleaning cycles over an extended period of use while maintaining the structural and filtration integrity of the seam. In a particularly exemplary embodiment, a seamed filter sealed with a seam tape by way of the invention can undergo greater than 50,000 cleaning cycles over the lifetime of the filter (>3 years) with substantially no cracking or peeling of the sealed seam, thus advantageously reducing the release of dust emissions through the seam of the filter during operation in a cement baghouse, as compared with other presently available filters.

Seam tapes for seam sealing provided by way of the invention pass the "Crack Test" as described further below. A seam tape passes the Crack Test when there are substantially no cracks in the seam tape visible to the eye or no substantial leak path visible with a scanning electron microscope at 2500× through which dust greater than 2.5 µm could escape.

The filter media of the filter may be any suitable filter sheet material which can be sewn and/or heat-sealed, especially with a seam tape as provided by way of the invention.

Suitable filter media include wovens, nonwovens, or felts of expanded polytetrafluoroethylene (ePTFE), fiberglass, aramid, polyimide, polyester, or polyphenylene sulfide.

Suitable filter bags for use in the invention are comprised of a filter media of ePTFE as described in U.S. Pat. Nos. 4,983,434, 5,549,966, 5,667,611, and 5,928,414, which are incorporated herein by reference. The filter bag may comprise other layers in addition to the filter media, such as an inner liner and outer wrap of a non-woven material such as of polypropylene.

Other especially suitable filter bags for use in the invention include those comprised of fiberglass, especially ePTFE membrane/acid resistant fiberglass fabric filter bags. To date, there are no commercially available seam-sealed fiberglass filter bags which can reliably withstand repeated bag cleaning cycles (>50,000) during the life of the bag (>3 years) without cracking and peeling occurring in the seam tape.

The filter bag may be formed from one or more sheets of filter media. The number of sheets employed will depend in part upon the ultimate shape of the filter bag and its use. In most instances, a filter bag can be prepared with only one or two filter media sheets which will desirably minimize the extent of seams. Most preferably, the filter bag is constructed from a single sheet of filter media, thereby resulting in the existence of a single seam joining the edges of the sheet.

The seam joining the sheet of filter media can be formed by conventional methods, such as sewing or heat welding. The material, size, and nature of the thread used to join filter media portions to form the seam of the filter depends upon the filter media, the other materials which may be used to form the filter, and the ultimate use of the filter. The manner in which the seam on the filter bag is sewn may be varied. For example, the seam may be straight-stitched, with a binder strip inserted between the edges of the filter media prior to sewing the seam, or the seam may be over-stitched. Preferably, the seam is a felled seam.

The seam of the filter is sealed with a seam tape which comprises a layer of an expanded fluoropolymer and a material for adhering to and sealing the seam; wherein the expanded fluoropolymer component of the seam tape has a crosswise direction matrix modulus of greater than about 1,950 psi at room temperature and an enthalpy ratio of less than 0.6.

An exemplary embodiment of the expanded fluoropolymer is ePTFE and copolymers thereof.

In another embodiment, the expanded fluoropolymer component of seam tape has crosswise direction matrix modulus of greater than about 4,000 psi.

In a more preferred embodiment, the expanded fluoropolymer has a crosswise direction matrix modulus of greater than about 8,000 psi.

In the most preferred embodiment, the expanded fluoropolymer has a crosswise direction matrix modulus of greater than about 12,000 psi.

In another embodiment, the expanded fluoropolymer has an enthalpy ratio of less than about 0.45.

In a more preferred embodiment, the expanded fluoropolymer has an enthalpy ratio of less than about 0.3.

In the most preferred embodiment, the expanded fluoropolymer component of seam tape has an enthalpy ratio of less than about 0.2.

ePTFE for use in the seam tape may be prepared in accordance with the description in U.S. Pat. Nos. 4,187,390; 4,110,392; and 3,953,566, which are incorporated herein by reference.

In another embodiment, the seam tape may be constructed to be sufficiently conductive to eliminate the static charge from a bag. Static dissipation may aid in cleaning the dust cake off of the bag. Static dissipation can be achieved through the addition of conductive pathways through the addition of substances such as but not limited to conductive carbon or metal particulates to the expanded fluoropolymer such that the seam tape would have a resistivity of less than $10^{13}$ Ohms-cm as determined by ASTM D257-90, as described in U.S. Pat. No. 5,527,569 which is incorporated herein by reference.

It has now been advantageously discovered by way of the invention that seam tapes which comprise an expanded fluoropolymer, preferably ePTFE, having a crosswise direction matrix modulus of greater than about 1,950 psi at room temperature and an enthalpy ratio of less than 0.6, preferably less than about 0.3, and most preferably less than about 0.2, can be used to seal the seams of filter bags. The seam tapes of the invention advantageously remain substantially free of cracks and holes which would allow particulate ingress through the tape and the seam, after repeated cleaning cycles, thus reducing the release of particulate emissions.

Surprisingly, it was thus discovered that some ePTFEs having higher elongation to failure at room temperature failed the Crack Test. One skilled in the art would think ability to survive the strain of pulsing would be linked to elongation to failure. Even more surprising, high modulus, which means higher stress at a given strain, passed. While not wishing to be bound by any particular theory, higher room temperature elongation samples were associated with samples that had large nodes that tend to crack when fatigued at high temperatures. Samples with high modulus, however, unexpectedly survived, possibly due to fibril reorientation.

Fibril reorientation allows a seam tape to elongate without changing its structure. These tapes have many fibrils with a component of orientation in the crosswise direction. When these tapes are pulsed and stressed in the crosswise direction, the fibrils can reorient themselves further into the crosswise direction, allowing the tape to strain in the crosswise direction without permanently changing the structure. With some application of heat, such as in pulse-jet cleaning applications where temperature is upwards of 200° C., the heat may enable the fibrils to return to their original orientation, giving the seam tape an elastic-like behavior. Since the structure may remain substantially unchanged after the stress of a back pulse, when subsequent back pulses occur, the structure is able to continue to reliably withstand the stress without creating flaws which could lead to cracking.

With this theory in mind, it is useful to be able to quantify the amount of fibrils with directional components in the crosswise direction. To do this, a crosswise direction matrix modulus can be measured. More fibrils in the crosswise direction will make the seam tape stiffer, increasing the matrix modulus in the crosswise direction.

To compare seam tapes, one accounts for the amount of expansion of the tape by normalizing the modulus by the density of the seam tape sample compared to full density PTFE, which provides a matrix modulus.

The crosswise direction matrix modulus of expanded fluoropolymer, preferably ePTFE, can be quantitatively determined then by way of the following equation:

$$E_{CW}^{Matrix} = E_{CW}\left(\frac{\rho_{Full\_Density\_Fluoropolymer}}{\rho_{sample}}\right)$$

wherein $E_{CW}$ is the crosswise modulus, $E_{CW}^{Matrix}$ is the crosswise matrix modulus and $\rho$ is density. For PTFE, $\rho_{Full\_Density\_Fluoropolymer}$ is 2.2 g/cm³. Corresponding densities for other fluoropolymers should be used if the expanded fluoropolymer is not ePTFE. To determine the crosswise modulus, tensile testing can be performed as described in the Test Methods.

Figure 5:
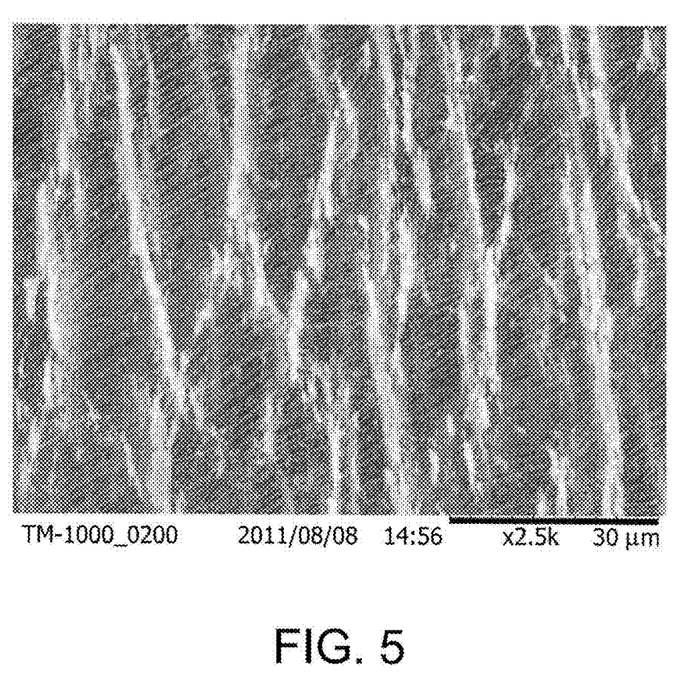
FIG. 5 shows an SEM of a seam tape that passed the Crack Test.

FIG. 5 shows an SEM of a sample which failed the Crack Test due to having an ePTFE component with a crosswise matrix modulus of <1,950 psi.

ePTFE having a crosswise matrix modulus of greater than about 1,950 psi is suitable for use in the seam tapes by way of the invention.

In addition to having a crosswise matrix modulus of greater than about 1,950 psi, ePTFE suitable for use in the seam tapes used for seam sealing a filter demonstrate amorphous locking and have characteristically low enthalpy ratios.

When the expanded products are heated to above the lowest crystalline melting point, of the poly(tetrafluoroethylene), disorder begins to occur in the geometric order of the crystallites and the crystallinity decreases, with concomitant increase in the amorphous content of the polymer, typically to 10% or more. These amorphous regions within the crystalline structure appear to greatly inhibit slippage along the crystalline axis of the crystallite and appear to lock fibrils and crystallites so that they resist slippage under stress. Therefore, the heat treatment may be considered an amorphous locking process. The important aspect of amorphous locking is that there be in increase in amorphous content, regardless of the crystallinity of the starting resins. Whatever the explanation, the heat treatment above 327° C. causes a surprising increase in strength often doubling that of the unheat-treated material.

Because the upper melting range of poly(tetrafluoroethylene) polymer (as polymerized) is about 345° C., the heat treatment appears to be more effective above this temperature, although lower temperatures are equivalent if the exposure time is long enough.

The ePTFE materials of use in the inventive seam tapes possess lower enthalpy ratios than known tapes used in filter bags. Accordingly, the inventive seam sealing tapes are amorphous locked and thus possesses a low enthalpy ratio of less than 0.6, as discussed hereinafter.

While not wishing to be bound by any particular theory, the theory behind why an ePTFE seam tape with a high enthalpy ratio (>0.6) fails pulsing is related to the method by which it develops leak paths. Tapes with higher enthalpy ratios have a higher amount of nodes which can be further fibrillated. Even though they may have a high crosswise matrix modulus (>1,950 psi) with many fibrils in the crosswise direction, when these nodes are stressed, they can continue to fibrillate which eventually can lead to long open pores through which particulate matter could escape.

By comparison, a tape with a low enthalpy-ratio will have nodes which are more resistant to further fibrillation. In this way, having a low enthalpy ratio may advantageously enable a high matrix modulus tape to strain repeatedly by fibril reorientation rather than nodal fibrillation.

The Enthalpy of Melting Ratio for expanded fluoropolymer, preferably ePTFE, can be calculated according to the following formula:

$$\text{Enthalpy\_Ratio} = \frac{H_{345°\,C.}}{H_{327°\,C.} + H_{345°\,C.} + H_{380°\,C.}}$$

which Enthalpy (H) Ratio is determined by integrating the endotherms from all melting transition temperatures of ePTFE (327° C., 345° C., and 380° C.) as determined by Differential Scanning calorimetry, as described in the Test Methods. Although not wishing to be bound by any theory, it is thought that the melting transition at 345° C. represents nodes which are capable of being further expanded. The melting transition at 327° C. represents nodes which cannot be further expanded; and the melting transition at 380° C. represents fibrils.

Figure 3:
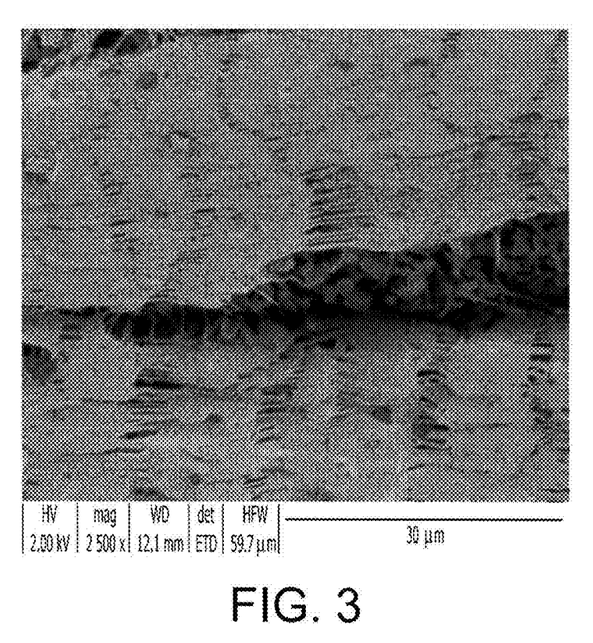
FIG. 3 shows an SEM of a failed seam tape with enthalpy ratio of >0.6.

FIG. 3 shows an SEM of a seam tape which failed the Crack Test due to having an enthalpy ratio of >0.6.

FIG. 5 shows an seam tape which passed the Crack Test. As shown in FIG. 5, there are no substantial leak paths visible with a scanning electron microscope at 2500× through which dust particulates larger than 2.5 μm could escape.

It has thus been surprisingly discovered by way of the invention that seam tapes comprised of expanded fluoropolymer having a crosswise direction matrix modulus of greater than about 1,950 psi at room temperature, more preferably greater than about 4,000 psi, and most preferably greater than about 12,000 psi, and an enthalpy ratio of less than about 0.6, preferably less than about 0.3, and most preferably less than about 0.2, are particularly suitable for use in the present invention.

The most preferred embodiment of expanded fluoropolymer is a homopolymer of tetrafluoroethylene (TFE). Another embodiment of the expanded fluoropolymer is a copolymer of TFE and one or more monomers selected from the group consisting of vinylidene difluoride (VDF), hexafluoropropylene (HFP), chlorotrifluoroethylene (CTFE), ethylene, vinylidene fluoride (VF), perfluoroalkoxy (PFA), perfluoroether, or trifluoroethylene.

With regard to the adhering material of the seam tape, the adhering material may be a continuous or discontinuous layer of a thermoplastic adhesive for adhering to and sealing the seam of the filter. The adhesive layer can be applied, affixed, or attached to the layer of expanded fluoropolymer to form the seam tape. A discontinuous layer of adhesive and how it is formed and applied to the expanded fluoropolymer is described in U.S. Pat. No. 7,306,729 which is incorporated herein by reference.

Any thermoplastic adhesive, so long as it has a melting temperature below that of the expanded fluoropolymer, may be utilized. Suitable adhesive materials include, but are not limited to, tetrafluoroethylene/hexafluoropropylene copolymer (FEP), perfluoroalkoxy polymer (PFA), polyvinylidene fluoride (PVDF), tetrafluoroethylene/hexafluoropropylene/vinylidene fluoride copolymer (THV), chlorotrifluoroethylene (CTFE), or a polyolefin selected from the group consisting of polyethylene (PE), polypropylene (PP), ethylene tetrafluoroethylene (ETFE) and ethylene fluorinated ethylene propylene (EFEP). Preferred embodiments of adhesives are FEP and PFA for high temperature applications. The most preferred embodiment of adhesive is FEP.

Alternatively, the adhering material may be an expanded fluoropolymer with adhesive properties which come from the expanded structure itself.

The seam tape can be constructed in the following manner. A non-expanded or slightly expanded (e.g., 2:1 expansion) substrate of PTFE is laminated to a film layer of thermoplastic fluoropolymer, such as FEP 100 available from E. I. duPont and Company of Wilmington, Del., to form a composite. Lamination occurs at a temperature above the melt temperature of the thermoplastic. The laminate is then further stretched at a temperature above the melt of the thermoplastic (e.g., at a ratio of 2:1 to 100:1 or more), drawing the composite down to a high strength material. One suitable procedure for processing PTFE in this manner is disclosed in U.S. Pat. No. 3,953,566 to Gore, which is incorporated by reference. This produces a high strength seam tape composite with very thin layers of expanded PTFE and FEP.

The seam tape may be applied to either the inside or the outside surface of the filter. It is preferred that the seam tape be applied to cover the seam on the outside surface of the filter bag. The seam tape is preferably positioned such that the overlap of the two adjacent edge portions is midway between the edges of the tape. Furthermore, the seam tape preferably extends beyond the ends of the stitch holes, if present, where possible.

Figure 4:
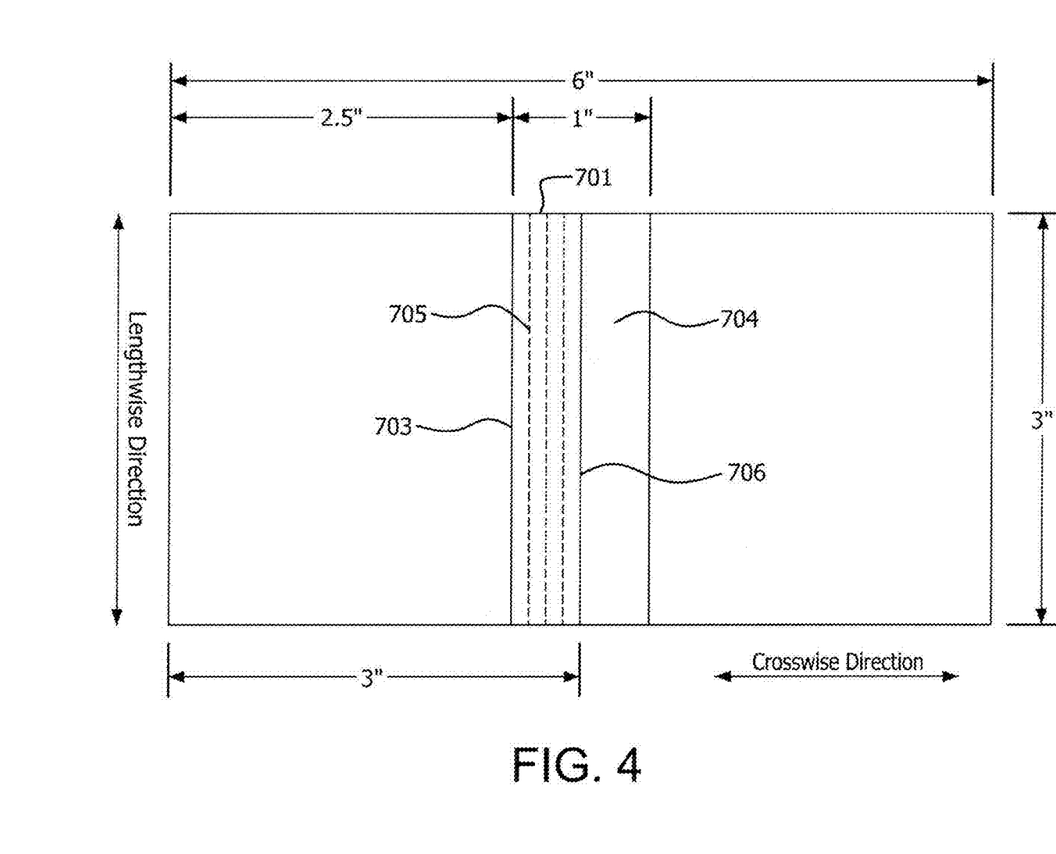
FIG. 4 shows a schematic illustration of the construction of the examples.

FIG. 4 shows the construction of a seamed filter with a seam tape as applied to the seam of the filter. A filter 700 is constructed by stitching a felled seam 701 at adjoining edges of the filter 700. The felled seam 701 is composed of three rows of stitches 703. A seam tape 704 is applied to the seam 701 over the middle of the edge of the felled seam 701 such, that it is 2.5" from the edge in the crosswise direction. The transverse direction of the seam tape is parallel to the crosswise direction of the filter 700 and the longitudinal direction of the seam tape is parallel to the lengthwise direction, of the filter 700. The seam tape 704 adheres to seam 701 and prevents leak paths for dust particulates through stitch holes 705 of seam 701. After undergoing greater than 50,000 pulse-jet or reverse air cleaning cycles at 200° C. as carried out by the Crack Test, the seam tape 704 of the invention advantageously has substantially no visible cracks or no substantial leak paths visible with scanning electron microscope at 2,500× through which dust particulates greater than 2.5 μm could escape during particulate filtration operations, for example in a cement baghouse, thus advantageously reducing dust emissions. Dimensions of filter 700 in the lengthwise and crosswise direction are shown in FIG. 4.

For seam sealing, the seam tape can be disposed over the seam of the filter as described above, the tape having a lengthwise direction substantially parallel to the seam and a crosswise direction substantially perpendicular to the seam. The filter with seam tape laid over the seam ("the sample") can then be placed into a heated press. The press is set at a temperature above the melt temperature of the adhesive but less, than the degradation temperature of the expanded fluoropolymer. The amount of heat and pressure required to heatseal the tape will depend in part on the particular thermoplastic tape and filter media used in the filter. The applied heat and pressure ought not to be such that the integrity of the filter is compromised. A piece of high melt polymer (higher than the temperature of the press) may be utilized to protect the seam tape from the plates of the press. Application of heat and pressure sufficient for the adhesive to migrate into the filter material can be applied. The seam-sealed filter can then be removed from the press and allowed to cool. Alternatively, the expanded fluoropolymer can act as an adhesive.

Alternatively, the seam tape may be applied to the filter bag using numerous methods known to the seam sealing industry such as but not limited to a hot air sealing machine, ultrasonic bonding, or impulse welders. The preferred methodology is hot air seam sealing machines for producing long seams.

By way of the invention, it has been surprisingly discovered that filters, especially filter bags having a seam sealed by a seam tape comprised of a layer of an expanded fluoropolymer and a layer of an adhesive; wherein the expanded fluoropolymer component of the seam tape has a crosswise direction matrix modullis of greater than about 1,950 psi at room temperature and an enthalpy ratio of less than 0.6, can withstand repeated cleaning cycles of >50,000 cycles without cracking and peeling and thus provide low dust emissions from cement baghouses. By way of the invention then, seam-sealed filter bags are provided which advantageously meet EPA emissions standards for both new and existing sources.

The filter bag provided by way of the present invention has a variety of suitable end uses. In particular, the filter bag may be used to filter paints and coatings, especially water-based paints and primers, chemicals, petrochemical products, water, aqueous solutions and suspensions, and the like. The filter bag of the invention may be used in the production of minerals, chemicals, metals and energy. Most particularly, the seam-sealed filter bag of the invention can be used to filter and collect particulate dust emissions in baghouses used in cement plants. The utility of the filter bag is in no way limited to these uses and includes most uses for conventional filter bags.

Testing Methods

It should be understood that although certain methods and equipment are described below, any method or equipment determined suitable by one of ordinary skill in the art may be utilized.

Crack Test

The Crack Test was designed to approximate the stresses imparted into the seam of a filter bag during back pulsing of a pulse-jet baghouse as close as reasonably possible. Pulse jet baghouses use a high-pressure volume of air that is forced into the inside of the filter bag to induce mechanical movement in the bag and consequently knock the dust off of the outside of the bag. This test was developed to mimic the stresses imparted into a 5.72" diameter fiberglass filter bag being pulsed with a large volume of 5 bar air.

Figure 1:
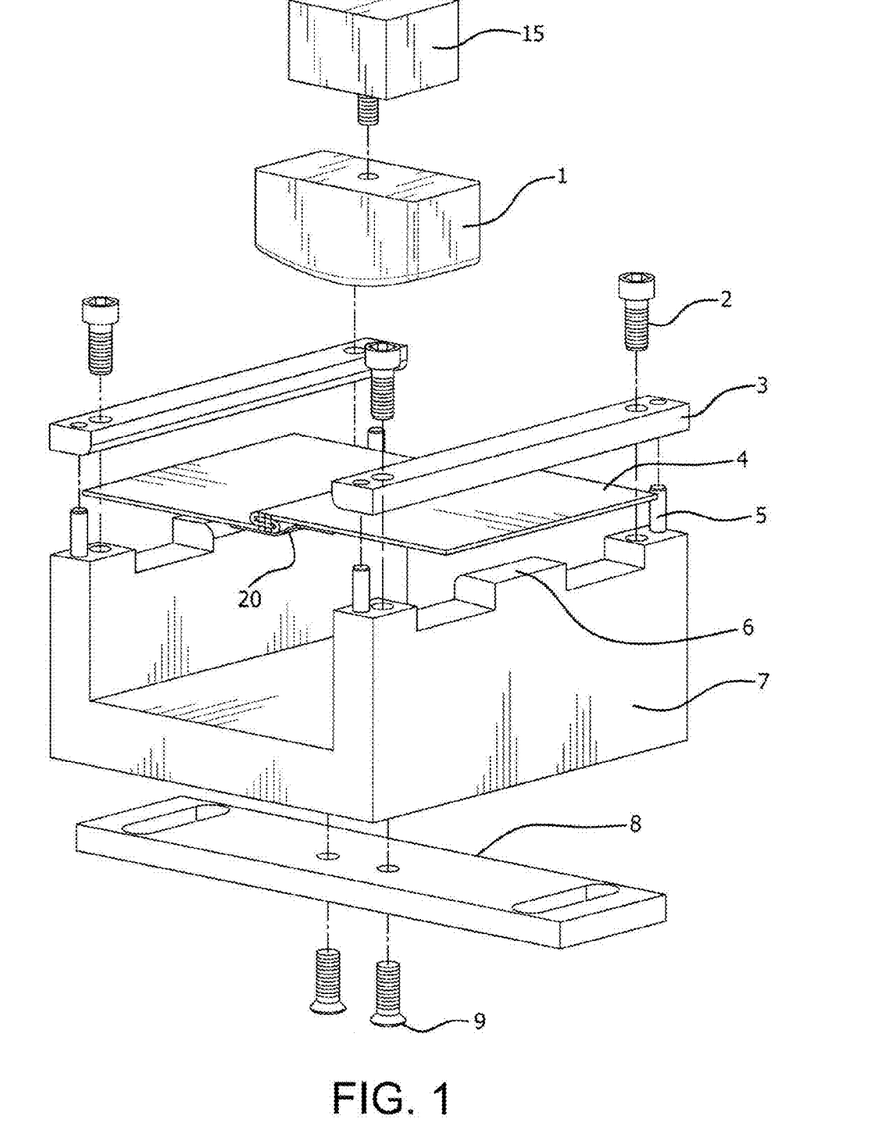
FIG. 1 shows a schematic illustration of the Apparatus utilized to carry out the Crack Test.
Figure 2:
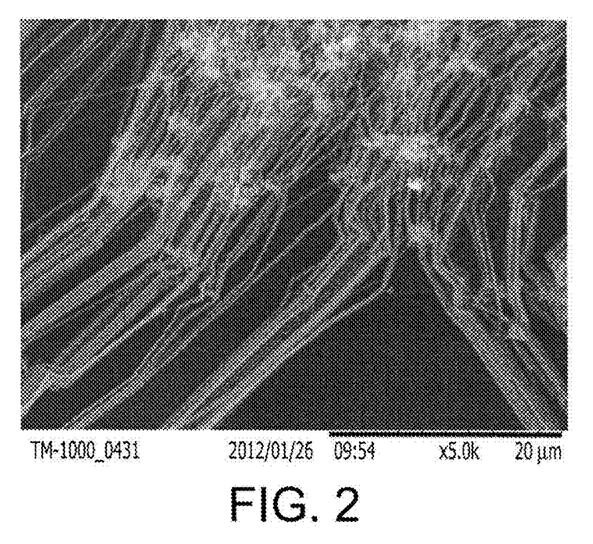
FIG. 2 shows an SEM of the ePTFE portion of a failed seam tape in which the ePTFE had a crosswise matrix modulus of <1,950 psi.

FIG. 1 shows the test apparatus utilized to carry out the Crack Test. The test fixture was designed to be used in a texture analyzer (TA) Stable Micro Systems TA.XTplus with an environmental chamber.

The Test fixture includes a probe (1) which is screwed into the crosshead of a Texture Analyzer ("TA")(15). The probe is curved to a radius of 2.860" to mimic the radius of a filter bag. The lengthwise portion of the probe should be positioned perpendicular to the lengthwise direction of the sample as shown. Screws (2) are installed through holding bar (3) into the base (7) to hold the test sample (4) in the fixture. Holding bar (3) is dimensioned to hold the sample (4) in place along its width. Four alignment pins (5) properly align the holding bar on the securing section (6) of the base (7).

A securing plate (8) is used to secure the base (7) of the fixture to the base of the texture analyzer (15). This is secured to the texture analyzer to assure that the base remains in the correct position under the probe. Screws (9) hold the securing plate to the base.

The sample (4) is loaded in the fixture (6) With the seam tape (20) facing away from the probe (1). The lengthwise direction of the seam tape is aligned to be parallel to the edges of the base (7) of the test fixture. The middle inch of sample is the only section between the securing section (6) of the base and the holding bar (3).

The Crack Test is carried out within an environmental chamber at 200° C. A fiberglass filter bag sample is secured in a fixture by tightening down the screws (2) on the holding bar (3). The probe (1) moves at 40 mm/s until a force of 1 kg is put onto the seam of the bag sample. The probe then retracts at 40 mm/s to its original position. This is counted as one cycle. The probe repeats this cycle 50,000 times in each test.

A sample passes the Crack Test when there is no crack in the seam tape visible to the eye or no substantial leak path visible with a scanning electron microscope at 2500× through which dust greater than 2.5 μm could escape. Conversely then, a sample fails the Crack Test when a crack in the seam tape is visible to the eye or a substantial leak path is visible with a scanning electron microscope at 2500× through which dust greater than 2.5 μm could escape.

Tensile Testing

Samples of an expanded fluoropolymer tape, such as ePTFE, were cut to a rectangle of 1"×6" such that the 6" section was parallel to the crosswise direction. The sample was free of wrinkles when cut. At least three samples were cut from each tape to be tested. Samples were measured to determine their mass using a Mettler Toledo model AG204 balance and their thickness using stationary Heidenhain model MT 60M gage. Each sample was then tested to determine its tensile properties using Instron model 5565 grip plates such that each end of the sample was held between 1" (vertical)× 1.5" (horizontal) grip plates with one surface serrated, the other with a rubber face to help prevent sample slippage. The gage length between the grips was set at 2.0 inches and the crosshead speed was set to 20 in/min. A 112 lb calibrated load cell was used to carry out these measurements and data was collected at a rate of 20 times per second. Laboratory temperatures were between 68° F. and 72° F. to ensure comparable results. At least three samples were tested in the crosswise direction. Data analysis was performed with the Bluehill 2 software data analysis package. Crosswise modulus of the expanded fluoropolymer was calculated between the strain range of 0.005 in. to 0.1 in. Density was calculated using the following equation:

$$\rho_{sample} = \frac{m}{l * w * t}$$

Where: ρ=density (g/cm³)
m=mass (g)
l=length (6 cm)
w=width (1 cm)
t=thickness (cm)

Crosswise direction matrix modulus of the expanded fluoropolymer was then calculated using the equation:

$$E_{CW}^{Matrix} = E_{CW}\left(\frac{\rho_{Full\_Density\_Fluoropolymer}}{\rho_{sample}}\right)$$

Where:

$E_{CW}^{Matrix}$=Crosswise direction matrix modulus (PSI)
$E_{CW}$=Crosswise direction modulus (PSI)
$\rho_{Full\_Density\_Fluoropolymer}$=density of the full density fluoropolymer used; and
$\rho_{sample}$=density of the sample tested.

The final crosswise direction matrix modulus was determined by averaging the crosswise direction matrix moduli for the three samples tested.

Differential Scanning Calorimetry

Differential Scanning calorimetry (DSC) was performed to determine the melting transitions of the material. The equipment used to perform these measurements was a TA Instruments Differential Scanning calorimeter (Model #Q2000), calibrated using an appropriate standard, with an attached Liquid Nitrogen Cooling System (TA LNCS).

Sample preparation was carried out by cutting layers of the ePTFE sample with a 4 mm diameter punch so that the total weight was approximately 5-10 milligrams. The balance used to weigh the sample was a Sartorius MC210P Electronic Microbalance. Once cut, the sample was then placed into a Tzero aluminum sample pan (TA P/N 901683.901), the Tzero lid (TA P/N 901671.901) was placed on top of the pan and the lid was crimped in place using a sample press (TA P/N 901600.901). This sample was then placed into the DSC autosampler to be transferred to the DSC cell to be analyzed. The reference material that was used for this series of measurements was an empty Tzero aluminum sample pan and lid.

Once the sample and reference pan were inserted into the cell, the atmosphere in and around the test chamber was purged with helium gas. The testing cycle was set up to equilibrate at −50 degrees Celsius and then ramped to +425 degrees Celsius at a rate of 10 degrees Celsius per minute. At the conclusion of the test, an energy plot output is created showing the measured heat flow in watts/gram (i.e. the measured output normalized to the actual mass of the ePTFE sample being tested) versus the temperature during the scan. The software program Universal Analysis 2000 (version 4.7 A) by TA Instruments was used to generate a baseline by drawing a line between the measured data at +310 and +390 degrees Celsius. The area between the measured data and this baseline is then integrated to provide an enthalpy value in Joules/gram. An enthalpy ratio was then calculated using the following equation:

$$\text{Enthalpy\_Ratio} = \frac{H_{345°\ C.}}{H_{327°\ C.} + H_{345°\ C.} + H_{380°\ C.}}$$

wherein H is enthalpy.

Having generally described this invention, a further understanding can be obtained by reference to certain specific examples illustrated below which are provided for purposes of illustration only and are not intended to be all inclusive or limiting unless otherwise specified.

EXAMPLES

Example 1

To manufacture an ePTFE/FEP composite film according to the present invention, a PTFE fine powder suitable for paste extrusion and expansion from the E.I. Dupont Company of Wilmington, Del. was used as a raw material. The PTFE fine Powder was blended with Isopar K (from Exxon Mobil Corp., Fairfax, Va.) in the proportion of 0.218 g./g. of fine powder. The lubricated powder was compressed in a cylinder to form a pellet and placed into an oven set at 49° C. for sufficient dwell time to bring the pellet to temperature. The compressed and heated pellet was then ram extruded to produce a tape that was then calendared to approximately 40% of its original thickness. The lubricant was then driven off by heating. The tape then underwent a longitudinal expansion of 1.4:1 ratio. The tape was then subjected to transverse expansion (6:1) followed by a 380 C sintering while restrained. The resulting enthalpy ratio was 0.15 and the resulting transverse matrix modulus was 17,819 psi.

A cut from the resultant membrane was made to match up in width to a 1 mil thick FEP-100 film (available from DuPont Fluoropolymers, Wilmington, Del.). The two materials were then combined with the FEP film placed on top of the ePTFE material and both together were then given a transverse ratio of 1.10:1 at a temperature of 320 C. The resultant composite roll was then sliced to approximately 1" in the transverse direction.

A 3" long sample was then cut from the 1" slit provided. This resulted in a seam tape sample 1" wide in the transverse direction and 3" long in the longitudinal direction. Two edges of woven PTFE-coated fiberglass 6250 of PRISTYNE® filter media (available from W.L. Gore & Associates, Elkton, Md.) were stitched together using a felled seam with 3 rows of stitches as shown in FIG. 4. The fiberglass stitched bag sample has dimensions of 3" in the lengthwise direction and 6" in the crosswise direction, with the edge of the felled seam occurring 3" from the edge in the crosswise direction. The seam tape sample was disposed over the middle of the edge of the felled seam such that it was 2.5" from the edge in the crosswise direction as shown in FIG. 4. The transverse direction of the seam tape was parallel to the crosswise direction of the fiberglass sample and the longitudinal direction of the seam tape was parallel to the lengthwise direction of the fiberglass sample. The combined seam tape and fiberglass sample was covered with skived PTFE to prevent the seam tape from sticking to the press platens. The combined seam tape and fiberglass sample was put into a press at 300° C. for 10 minutes with 10 psi pressure over the entire area of the seam tape. The sample was then removed from the press, the skived PTFE was removed, and the sample was allowed to cool for a period no less than 5 minutes.

The sample was then tested as described in the Crack Test.

Example 2

An ePTFE/FEP composite tape was prepared as similarly described in Example 1. A PTFE fine powder suitable for paste extrusion and expansion from the E.I. DuPont Company of Wilmington, Del. was used as a raw material. The PTFE fine Powder was blended with Isopar K (from Exxon Mobil Corp., Fairfax, Va.) in the proportion of 0.193 g./g. of fine powder. The lubricated powder was compressed in a cylinder to form a pellet and placed into an oven set at 49° C. for sufficient dwell time to bring the pellet to temperature. The compressed and heated pellet was then ram extruded into the form of a tape. The tape was then doubled up and calendared to a thickness that is approximately 33% of its original combined thickness. The lubricant was then driven off by heating. The tape then underwent a longitudinal expansion of 1.73:1 ratio. The tape was then subjected to transverse expansion (11.7:1) followed by a 380 C sintering while restrained. The resultant material had an enthalpy ratio of 0.56 and a transverse direction matrix modulus of 2,211 psi.

A cut from the resultant membrane was made to match up in width to a 1 mil thick. The two materials were then combined with the FEP film placed on top of the ePTFE material and both together were given a transverse ratio of 1.10:1 at a temperature of 320 C. The resultant composite roll was then sliced to approximately 1" in the transverse direction.

A seam tape was then prepared and applied and, sealed to a fiberglass stitched bag sample as described in Example 1.

The sample was then tested as described in the Crack Test.

Example 3

An ePTFE/FEP composite tape was prepared as similarly described in Example 1. A PTFE fine powder suitable for paste extrusion and expansion from Daiken Industries was used as a raw material. The PTFE fine Powder was blended with Isopar K (from Exxon Mobil Corp., Fairfax, Va.) in the proportion of 0.184 g./g. of fine powder. The lubricated powder was compressed in a cylinder to form a pellet and placed into an oven set at 49° C. for sufficient dwell time to bring the pellet to temperature. The compressed and heated pellet was then ram extruded into the form of a tape. The lubricant was then driven off by heating. The resultant dry tape then went through a longitudinal expansion ratio of 10:1. The resultant material has a transverse direction matrix modulus of 15,234 psi. The tape then underwent a lamination process similar to what was described in U.S. Pat. No. 5,554,236. The tape was laminated to 5.0 mil FEP-100 film across heated surfaces at a temperature set to 310 C and a longitudinal ratio of 1.10:1. The composite tape was then given a transverse ratio of 5:1 at a temperature set point of 320 C. The material was then subjected to a sintering set point of 390 C while being restrained. The resultant ePTFE portion of the composite had a transverse matrix modulus of 15,234 and an enthalpy ratio of 0.18. The resultant composite roll was then sliced to approximately 1" in the transverse direction.

A seam tape was then prepared and applied and sealed to a fiberglass stitched bag sample as described in Example 1.

The sample was then tested as described in the Crack Test.

Example 4

An ePTFE/FEP composite tape was prepared as similarly described in Example 1. A PTFE fine powder suitable for paste extrusion and expansion from the E.I. DuPont Company of Wilmington, Del. was used as a raw material. The PTFE fine Powder was blended with Isopar K (from Exxon Mobil Corp., Fairfax, Va.) in the proportion of 0.168 g./g. of fine powder. The lubricated powder was compressed in a cylinder to form a pellet and placed into an oven set at 49° C. for sufficient dwell time to bring the pellet to temperature. The compressed and heated pellet was then ram extruded into the form of a tape that was approximately 54 mils thick. This tape was then put through rollers twice, first to 25 mils, then again to reach a final thickness of 8.5 mils. The lubricant was then driven off by heating. The resultant material has a transverse direction matrix modulus of 29,050 psi.

The tape then underwent a lamination process similar to what was described in U.S. Pat. No. 5,554,236. The tape was laminated to 5.0 mil FEP-100 film across heated surfaces at a temperature set to 310 C and a longitudinal ratio of 1.10:1. The composite tape was then given a transverse ratio of 5:1 at a temperature set point of 320 C. The material was then subjected to a sintering set point of 390 C while being restrained. The ePTFE portion of this composite has an enthalpy ratio of 0.23. The resultant composite roll was then sliced to approximately 1" in the transverse direction.

A seam tape was then prepared and applied and sealed to a fiberglass stitched bag sample as described in Example 1.

The sample was then tested as described in the Crack Test.

Example 5

To manufacture an ePTFE/FEP composite film according to the present invention, a PTFE fine powder suitable for paste extrusion and expansion from the E.I. Dupont Company of Wilmington, Del. was used as a raw material. The PTFE fine Powder was blended with Isopar K (from Exxon Mobil Corp., Fairfax, Va.) in the proportion of 0.218 g/g. of fine powder. The lubricated powder was compressed in a cylinder to form a pellet and placed into an oven set at 49° C. for sufficient dwell time to bring the pellet to temperature. The compressed and heated pellet was then ram extruded to produce a tape that was approximately 28 mils thick. This tape was then put through rollers to reach a thickness of 11 mils. The lubricant was then driven off by heating. The tape then underwent a longitudinal expansion of 1.4:1 ratio. The tape was then subjected to transverse expansion (6:1) followed by a 380 C sintering while restrained. The resulting enthalpy ratio was 0.15 and a longitudinal direction matrix modulus of 151,356 psi.

A cut from the resultant membrane was made to match up in width to a 1 mil thick FEP film as described in Example 1. The two materials were then combined with the FEP film placed on top of the ePTFE material and both together were then given a transverse ratio of 1.10:1 at a temperature of 320 C. The resultant composite roll was then sliced to approximately 1" in the longitudinal direction.

A 3" long sample was then cut from the 1" slit provided. This resulted in a seam tape sample 1" wide in the longitudinal direction and 3" long in the transverse direction. Two edges of woven PTFE-coated fiberglass 6250 of PRISTYNE® filter media (available from W.L. Gore & Associates, Elkton, Md.) were stitched together using a felled seam with 3 rows of stitches as shown in FIG. 4. The fiberglass stitched bag, sample has dimensions of 3" in the lengthwise direction and 6" in the crosswise direction, with the edge of the felled seam occurring 3" from the edge in the crosswise direction. The seam tape sample was disposed over the middle of the edge of the felled seam such that it was 2.5" from the edge in the crosswise direction as shown in FIG. 4. The longitudinal direction of the seam tape was parallel to the crosswise direction of the fiberglass sample and the transverse direction of the seam tape was parallel to the lengthwise direction of the fiberglass sample. The combined seam tape and fiberglass sample was covered with skived PTFE to prevent the seam tape from sticking to the press platens. The combined seam tape and fiberglass sample was put into a press at 300° C. for 10 minutes with 10 psi pressure over the entire area of the seam tape. The sample was then removed from the press, the skived PTFE was removed, and the sample was allowed to cool for a period no less than 5 minutes.

The sample was then tested as described in the Crack Test.

Comparative Example 1

An ePTFE/FEP composite tape was prepared as similarly described in Example 1. A PTFE fine powder suitable for paste extrusion and expansion from the E.I. DuPont Company of Wilmington, Del. was used as a raw material. The PTFE fine Powder was blended with Isopar K (from Exxon Mobil Corp., Fairfax, Va.) in the proportion of 0.213 g./g. of fine powder. The lubricated powder was compressed in a cylinder to form a pellet and placed into an oven set at 49° C. for sufficient dwell time to bring the pellet to temperature. The compressed and heated pellet was then ram extruded into the form of a tape with a approximate thickness of 26 mils. This tape was then put through rollers to reach a thickness of 11 mils. The lubricant was then driven off by heating. The tape then underwent a longitudinal expansion of 1.62:1 ratio. The tape was then subjected to transverse expansion (11.7:1) followed by a 380 C sintering while restrained. The resultant material has an enthalpy ratio of 0.62 and a transverse direction matrix modulus of 53,751 psi.

A cut from the resultant membrane was made to match up in width to a 1 mil thick FEP film as described in Example 1. The two materials were then combined with the FEP film placed on top of the ePTFE material and both together were then given a transverse ratio of 1.10:1 at a temperature of 320 C. The resultant composite roll was then sliced to approximately 1" in the transverse direction.

A seam tape was then prepared and applied and sealed to a fiberglass stitched bag sample as described in Example 1.

The sample was then tested as described in the Crack Test.

Comparative Example 2

An ePTFE/FEP composite tape was prepared as described similarly in Example 1. A PTFE fine powder suitable for paste extrusion and expansion from the E.I. Dupont Company of Wilmington, Del. was used as a raw material. The PTFE fine Powder was blended with Isopar K (from Exxon Mobil Corp., Fairfax, Va.) in the proportion of 0.213 g./g. of fine powder. The lubricated powder was compressed in a cylinder to form a pellet and placed into an oven set at 16° C. for sufficient dwell time to bring the pellet to temperature. The compressed and heated pellet was then ram extruded in the form of a tape approximately 25 mils thick. This tape was then put through rollers to a thickness of 4 mils. The lubricant was then driven off by heating. A longitudinal expansion of 2.30:1 was then given to the tape as described in U.S. Pat. No. 3,953,566. The material was also subjected to a sintering temperature of 375 C while being restrained 1:1 longitudinally as described in U.S. Pat. No. 3,953,566. The resultant material has an enthalpy ratio of 0.16 and a transverse direction matrix modulus of 1858 psi.

The tape then underwent a lamination process similar to what was, described in U.S. Pat. No. 5,554,236. The tape was laminated to 0.5 mil FEP-100 film across heated surfaces at a temperature set to 310 C and a longitudinal ratio of 1.43:1. The resultant composite roll was then sliced to approximately 1" in the transverse direction.

A seam tape was then prepared and applied and sealed to a fiberglass stitched bag sample as described in Example 1.

The sample was then tested as described in the Crack Test.

Table 1 shows that the samples from Examples 1-5 of the invention passed the Crack Test and that samples from Comparative Examples 1 and 2 failed.

TABLE 1

| Example Tape | Pass/Fail Crack Test | CW Matrix Modulus (PSI) | Enthalpies of ePTFE Component | | | |
|---|---|---|---|---|---|---|
| | | | Enthalpy at 380° C. | Enthalpy at 327° C. | Enthalpy at 345° C. | Enthalpy Ratio |
| Comparative Example 1 | Fail | 53751 | 2.84 | 7.32 | 16.58 | 0.62 |
| Comparative Example 2 | Fail | 1858 | 0.99 | 23.69 | 4.76 | 0.16 |
| Example 1 | Pass | 17819 | 1.57 | 14.09 | 2.84 | 0.15 |
| Example 2 | Pass | 2211 | 4.56 | 4.02 | 11.03 | 0.56 |
| Example 3 | Pass | 15234 | 4.98 | 9.78 | 3.34 | 0.18 |
| Example 4 | Pass | 29050 | 2.11 | 12.69 | 4.31 | 0.23 |
| Example 5 | Pass | 151356 | 1.57 | 14.09 | 2.84 | 0.15 |

Table 1 shows the crosswise direction matrix moduli and enthalpy ratios of ePTFE components of tapes which passed or failed the Crack Test. Crosswise matrix moduli and enthalpy ratios of ePTFE were measured prior to combination with FEP. Table 1 clearly demonstrates that seam tapes by way of the invention with ePTFE having a crosswise matrix modulus of >1,950 psi and an enthalpy ratio of less than 0.60 surprisingly and unexpectedly passed the Crack Test. ePTFE tapes having either a crosswise matrix modulus of <1,950 psi or an enthalpy ratio of >0.60 failed the Crack Test as defined above.

Having thus described the invention, what is claimed is:

1. A seam tape comprising:
   a layer of an expanded fluoropolymer and an adhering material to adhere to and seal a seam,
   wherein the expanded fluoropolymer of the seam tape has a crosswise direction matrix modulus of greater than about 1,950 psi at room temperature, is amorphously locked, and has an enthalpy ratio of less than 0.6.

2. The seam tape of claim 1 wherein the expanded fluoropolymer of the seam tape has a crosswise direction matrix modulus of greater than about 4,000 psi.

3. The seam tape of claim 2 wherein the expanded fluoropolymer of the seam tape has a crosswise direction matrix modulus of greater than about 8,000 psi.

4. The seam tape of claim 3 wherein the expanded fluoropolymer of the seam tape has a crosswise direction matrix modulus of greater than about 12,000 psi.

5. The seam tape of claim 1 wherein the enthalpy ratio is less than about 0.45.

6. The seam tape of claim 5 wherein the enthalpy ratio is less than about 0.3.

7. The seam tape of claim 6 wherein the enthalpy ratio is less than about 0.2.

8. The seam tape of claim 1 wherein the expanded fluoropolymer is a copolymer prepared from tetrafluoroethylene (TFE) and one or more monomers selected from the group consisting of vinylidene difluoride (VDF), hexafluoropropylene (HFP), chlorotrifluoroethylene (CTFE), ethylene, vinylidene fluoride (VF), perfluoroalkoxy (PFA), perfluoroether and trifluoroethylene.

9. The seam tape of claim 1 wherein the expanded fluoropolymer is ePTFE.

10. The seam tape of claim 1 wherein the seam tape is conductive.

11. The seam tape of claim 1 wherein the adhering material is a continuous or discontinuous layer of adhesive.

12. The seam tape of claim 1 wherein the expanded fluoropolymer has adhesive properties.

13. The seam tape of claim 11 wherein the adhering material is selected from the group consisting of tetrafluoroethylene/hexafluoropropylene copolymer (PEP), perfluoroalkoxy polymer (PFA), polyvinylidene fluoride (PVDF), tetrafluoroethylene/hexafluoropropylene/vinylidene fluoride copolymer (THV), chlorotrifluoroethylene (CTFE), polyethylene (PE), polypropylene (PP), ethylene tetrafluoroethylene (ETFE) and ethylene fluorinated ethylene propylene (EFEP).

14. The seam tape of claim 13 wherein the adhering material is FEP or PEA.

15. The seam tape of claim 14 wherein the adhering material is FEP.

16. A filter comprising:
   (a) a filter media having at least two adjacent edge portions joined by a seam; and
   (b) the seam tape of claim 1 disposed over the seam, wherein the seam tape has a lengthwise direction substantially parallel to the seam and a crosswise direction substantially perpendicular to the seam.

17. The filter of claim 16 wherein the expanded fluoropolymer of the seam tape has a crosswise direction matrix modulus of greater than about 4,000 psi.

18. The filter of claim 17 wherein the expanded fluoropolymer of the seam tape has a crosswise direction matrix modulus of greater than about 8,000 psi.

19. The filter of claim 18 wherein the expanded fluoropolymer of the seam ape has a crosswise direction matrix modulus of greater than about 12,000 psi.

20. The filter of claim 16 wherein the enthalpy ratio is less than about 0.45.

21. The filter of claim 20 wherein the enthalpy ratio is less than about 0.3.

22. The filter of claim 21 wherein the enthalpy ratio is less than about 0.2.

23. The filter of claim 16 wherein the expanded fluoropolymer is a copolymer comprising tetrafluoroethylene (TFE).

24. The filter of claim 16 wherein the expanded fluoropolymer is a copolymer prepared from tetrafluoroethylene (TFE) and one or more monomers selected from the group consisting of vinylidene difluoride (VDF), hexafluoropropylene (HFP), chlorotrifluoroethylene (CTFE), ethylene, vinylidene fluoride (VF), perfluoroalkoxy (PFA), perfluoroether and trifluoroethylene.

25. The filter of claim 16 where the expanded fluoropolymer is ePTFE.

26. The filter of claim 16 wherein the seam tape is conductive.

27. The filter of claim 16 wherein the adhering material is a continuous or discontinuous layer of adhesive.

28. The filter of claim 16 wherein the expanded fluoropolymer has adhesive properties.

29. The filter of claim 27 wherein the adhering material is selected from the group consisting of tetrafluoroethylene/hexafluoropropylene copolymer (FEP), perfluoroalkoxy polymer (PFA), polyvinylidene fluoride (PVDF), tetrafluoroethylene/hexafluoropropylene/vinylidene fluoride copolymer (THV), chlorotrifluoroethylene (CTFE), polyethylene (PE), polypropylene (PP), ethylene tetrafluoroethylene (ETFE) and ethylene fluorinated ethylene propylene (EFEP).

30. The filter of claim 29 wherein the adhering material is FEP.

31. The filter of claim 16 wherein the seam tape disposed over the seam undergoes >50,000 pulse-jet cleaning cycles at 200° C. and passes the Crack Test.

32. The filter of claim 16 wherein the filter media comprises a woven, nonwoven, or felt of ePTFE, fiberglass, aramid, polyimide, polyester, or polyphenylene sulfide.

33. The filter of claim 16 wherein the filter is a bag.

34. The filter of claim 16 which is seam-sealed.

35. A method of making a seam-sealed filter comprising:
   (a) applying the seam tape of claim 1 to a seamed filter, wherein said seam tape has a lengthwise direction substantially parallel to the seam and a crosswise direction substantially perpendicular to the seam; and
   (b) sealing the adhering material of the seam tape to the seam to form a seam-sealed filter.

36. The method of claim 35 wherein the expanded fluoropolymer of the seam tape has a crosswise direction matrix modulus of greater than about 4,000 psi.

37. The method of claim 36 wherein the expanded fluoropolymer of the seam tape has a crosswise direction matrix modulus of greater than about 8,000 psi.

38. The method of claim 37 wherein the expanded fluoropolymer of the seam tape has a crosswise direction matrix modulus of greater than about 12,000 psi.

39. The method of claim 35 wherein the enthalpy ratio is less than about 0.45.

40. The method of claim 39 wherein the enthalpy ratio is less than about 0.3.

41. The method of claim 40 wherein the enthalpy ratio is less than about 0.2.

42. The method of claim 35 wherein the expanded fluoropolymer is a copolymer prepared from tetrafluoroethylene (TFE) and one or more monomers selected from the group consisting of vinylidene difluoride (VDF), hexafluoropropylene (HFP), chlorotrifluoroethylene (CTFE), ethylene, vinylidene fluoride (VF), perfluoroalkoxy (PFA), perfluoroether and trifluoroethylene.

43. The method of claim 35 wherein the expanded fluoropolymer is ePTFE.

44. The method of claim 35 wherein the seam tape is conductive.

45. The method of claim 35 wherein the adhering material is a continuous or discontinuous layer of adhesive.

46. The method of claim 35 wherein the expanded fluoropolymer has adhesive properties.

47. The method of claim 45 wherein the adhering material is selected from the group consisting of tetrafluoroethylene/hexafluoropropylene copolymer (FEP), perfluoroalkoxy polymer (PFA), polyvinylidene fluoride (PVDF), tetrafluoroethylene/hexafluoropropylene/vinylidene fluoride copolymer (THV), chlorotrifluoroethylene (CTFE), polyethylene (PE), polypropylene (PP), ethylene tetrafluoroethylene (ETFE) and ethylene fluorinated ethylene propylene (EFEP).

48. The method of claim 47 wherein the adhering material is FEP.

49. The method of claim 35 wherein the seam tape disposed over the seam undergoes ≥50,000 pulse-jet cleaning cycles at 200° C. and passes the Crack Test.

50. The method of claim 35 wherein the filter media comprises a woven, nonwoven or felts of ePTFE, fiberglass, aramid, polyimide, polyester, or polyphenylene sulfide.

51. The method of claim 35 wherein the filter is a bag.

* * * * *

UNITED STATES PATENT AND TRADEMARK OFFICE
CERTIFICATE OF CORRECTION

PATENT NO. : 8,790,432 B2
APPLICATION NO. : 13/458442
DATED : July 29, 2014
INVENTOR(S) : Rebecca Lynn Roehmer et al.

Page 1 of 1

It is certified that error appears in the above-identified patent and that said Letters Patent is hereby corrected as shown below:

In the Claims

At column 19, line 7: change "(PEP)" to --(FEP)--

Signed and Sealed this
Twenty-first Day of October, 2014

Michelle K. Lee
*Deputy Director of the United States Patent and Trademark Office*